US012628720B2

(12) United States Patent　(10) Patent No.:　US 12,628,720 B2

Magarity et al.　(45) Date of Patent:　May 19, 2026

(54) GANG ASSEMBLY FOR A TILLAGE IMPLEMENT

(71) Applicant: CNH Industrial America LLC, New Holland, PA (US)

(72) Inventors: Brice Magarity, Deer Creek, IL (US); Timothy Richard Blunier, North Danvers, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 413 days.

(21) Appl. No.: 18/484,271

(22) Filed: Oct. 10, 2023

(65) Prior Publication Data

US 2025/0113751 A1　Apr. 10, 2025

(51) Int. Cl.
*A01B 63/16*　(2006.01)
*A01B 33/08*　(2006.01)
*A01B 63/00*　(2006.01)

(52) U.S. Cl.
CPC .......... *A01B 63/163* (2013.01); *A01B 33/087* (2013.01); *A01B 63/004* (2013.01); *A01B 63/006* (2013.01)

(58) Field of Classification Search
CPC ......... A01B 21/02; A01B 21/04; A01B 21/08; A01B 21/083; A01B 35/28; A01B 39/10
See application file for complete search history.

(56) References Cited

U.S. PATENT DOCUMENTS

| | | | | |
|---|---|---|---|---|
| 1,455,729 A | * | 5/1923 | Ingman | A01B 21/04 |
| | | | | 172/241 |
| 2,958,383 A | * | 11/1960 | Danielson | A01B 73/02 |
| | | | | 172/311 |
| 3,094,174 A | * | 6/1963 | Miller | A01B 21/08 |
| | | | | 172/531 |
| 3,101,792 A | | 8/1963 | Frank | |
| 3,397,748 A | * | 8/1968 | Whitesides | A01B 49/04 |
| | | | | 111/132 |
| 3,970,012 A | * | 7/1976 | Jones, Sr. | A01C 23/02 |
| | | | | 172/624.5 |
| 4,291,770 A | | 9/1981 | Engler | |
| 4,315,547 A | * | 2/1982 | Rau | A01B 79/00 |
| | | | | 172/240 |
| 4,424,869 A | * | 1/1984 | vom Braucke | A01B 1/06 |
| | | | | 172/349 |
| D273,656 S | * | 5/1984 | Dellinger | D8/8 |
| 4,492,272 A | | 1/1985 | Jensen | |
| 4,678,043 A | * | 7/1987 | vom Braucke | A01B 1/06 |
| | | | | 172/372 |
| 5,020,604 A | | 6/1991 | Peck | |
| 5,355,963 A | * | 10/1994 | Boyko | A01B 21/04 |
| | | | | 172/383 |
| 5,497,836 A | * | 3/1996 | Groff | A01C 7/006 |
| | | | | 172/555 |
| 6,499,543 B1 | | 12/2002 | Javerlhac | |

(Continued)

*Primary Examiner* — Matthew Troutman
(74) *Attorney, Agent, or Firm* — Fletcher Yoder, P.C.

(57) ABSTRACT

A tillage implement includes a front gang and a rear gang. The front gang includes a first row of spoke wheels, each coupled to a front axle at an oblique angle. The rear gang includes a second row of spoke wheels, each coupled to a rear axle at the oblique angle. The tillage implement also includes a row of disc blades positioned behind the front gang and the rear gang with respect to a direction of travel of the tillage implement.

20 Claims, 5 Drawing Sheets

(56) References Cited

U.S. PATENT DOCUMENTS

| 7,048,069 | B1 * | 5/2006 | Bollich | A01B 21/086 |
| | | | | 172/147 |
| 8,297,372 | B2 * | 10/2012 | Buckrell | A01B 45/026 |
| | | | | 172/594 |
| 8,596,375 | B2 * | 12/2013 | Winick | A01C 5/064 |
| | | | | 111/140 |
| 8,627,898 | B2 * | 1/2014 | Nance | A01B 23/06 |
| | | | | 172/186 |
| 8,746,361 | B2 | 6/2014 | Hake et al. | |
| 9,313,937 | B2 | 4/2016 | Gray et al. | |
| 9,398,738 | B2 * | 7/2016 | Achten | A01B 21/086 |
| 10,064,322 | B2 * | 9/2018 | Janelle | A01B 63/32 |
| 10,645,862 | B2 * | 5/2020 | Winick | A01C 5/064 |
| 12,484,464 | B2 * | 12/2025 | Mitchell, Jr. | A01B 49/027 |
| 2013/0199807 | A1 * | 8/2013 | Hoffman | A01B 5/04 |
| | | | | 172/1 |
| 2021/0368669 | A1 | 12/2021 | Brinker et al. | |

* cited by examiner

GANG ASSEMBLY FOR A TILLAGE IMPLEMENT

BACKGROUND

The present disclosure relates generally to a gang assembly for a tillage implement.

Certain agricultural implements include ground engaging tools for tilling soil. For example, a tillage implement may include disc blades and spoke wheels configured to break up the soil for subsequent planting or seeding operations. The spoke wheels may be positioned behind the disc blades relative to a direction of travel of the tillage implement. The spoke wheels may be rotatably coupled to an axle and arranged in a row to form a gang assembly extending laterally across the tillage implement. As the tillage implement is driven to move over the soil, spokes of the spoke wheels may penetrate and break up the soil as the spoke wheels rotate. In a phenomenon known as "plugging," sticky clods of soil and residue may accumulate on surfaces of the spoke wheels and in the spaces between adjacent spoke wheels. Additionally, displacement of the soil by the spoke wheels may cause the soil surface to become uneven. As a result, the effectiveness of the tillage implement may be reduced.

SUMMARY

In certain embodiments, a tillage implement includes a front gang and a rear gang. The front gang includes a first row of spoke wheels, each coupled to a front axle at an oblique angle. The rear gang includes a second row of spoke wheels, each coupled to a rear axle at the oblique angle. The tillage implement also includes a row of disc blades positioned behind the front gang and the rear gang with respect to a direction of travel of the tillage implement.

In certain embodiments, a tillage implement includes a gang support configured to support a front gang and a rear gang. The front gang includes a front axle extending along a lateral axis of the tillage implement. Additionally, the front axle is rotatably coupled to the gang support. The front gang also includes a first row of spoke wheels coupled to the front axle at an oblique angle. Furthermore, the tillage implement includes a rear gang having a rear axle rotatably coupled to the gang support, such that the rear axle is parallel to the front axle. The rear gang also includes a second row of spoke wheels coupled to the rear axle at the oblique angle. The tillage implement further includes a row of disc blades positioned behind the front gang and the rear gang with respect to a direction of travel of the tillage implement.

In certain embodiments, a tillage implement includes a frame, a set of disc blades coupled to the frame, and a gang assembly coupled to the frame ahead of the set of disc blades with respect to a direction of travel of the tillage implement. The gang assembly includes a front gang having a first row of spoke wheels. The spoke wheels of the first row are coupled to a front axle at an oblique angle. The gang assembly further includes a rear gang having a second row of spoke wheels. The spoke wheels of the second row are coupled to a rear axle at the oblique angle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
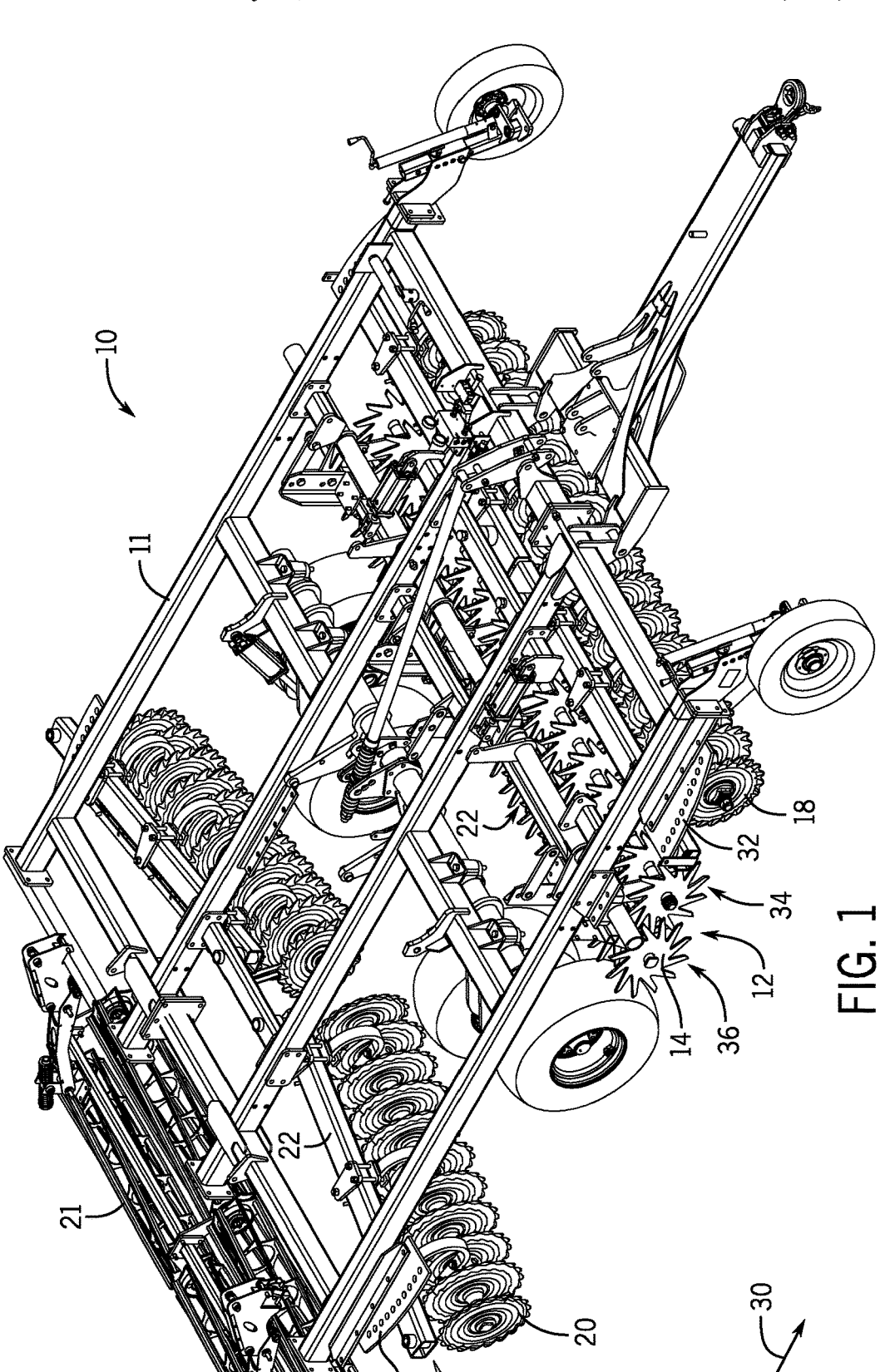
FIG. 1 is a perspective view of an embodiment of a tillage implement having a gang assembly of spoke wheels, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As briefly discussed above, a tillage implement may be used to prepare soil for planting or seeding operations. The tillage implement may include a variety of ground engaging tools attached to a frame. As the tillage implement is driven (e.g., by a work vehicle) to move across the soil, the ground engaging tools may agitate the soil for subsequent planting or seeding operations. For example, the ground engaging tools may break up compaction layers of the soil to enable roots to access nutrients and moisture more easily. The ground engaging tools may include vertical tillage tools, which rotate to cut residue while mixing the residue with the soil and/or to break up a top layer of the soil. For example, some ground engaging tools (e.g., disc blades, spoke wheels) may be arranged in gangs, and each gang may be rotatably coupled to the frame of the tillage implement. As the ground engaging tools work the soil, residue and dirt may build up on surfaces of the ground engaging tools and in the spaces between the ground engaging tools along the gang, thereby plugging the tools, which may reduce the effectiveness of the tillage implement.

In certain tillage implements, the ground engaging tools, including spoked wheels and disc blades, are mounted perpendicularly to one or more axles to form one or more respective gangs. An angle of at least one gang may be adjustable relative to the frame, thereby facilitating adjustment of the angle of the ground engaging tools of the gang relative to a direction of travel of the tillage implement. For example, a gang of disc blades may be rotatably coupled to a gang support, and the gang support may be pivotally coupled to the frame of the tillage implement. Accordingly, the angle of the disc blades relative to the direction of travel may be adjusted by rotating the gang. In this way, the disc blades may be positioned to displace soil laterally as well as vertically. While a gang angle (i.e., the angle between the gang support and the direction of travel) may be set by an operator, the angle of the ground engaging tools in existing systems is fixed relative to the gang support or an axle of the ground engaging tools at substantially ninety degrees. As such, during operation, the ground engaging tools interface with the soil surface at a constant angle, as determined by the setting of the gang angle.

The present disclosure is directed to a tillage implement having a gang assembly with spoke wheels coupled to one or more axles at an oblique angle. In contrast to the systems discussed above, the gang assembly disclosed herein includes spoke wheels that are tilted at an oblique angle relative to the axle(s) supporting the spoke wheels. For example, the gang assembly may include a front gang and a rear gang coupled to a gang support. The front gang and the rear gang may include a front axle coupled to a first row of spoke wheels and a rear axle coupled to a second row of spoke wheels, respectively. The oblique angle refers to the angle between a spoke wheel and the axle to which the spoke wheel is coupled. For example, the spoke wheels may be angled to be offset from perpendicular to the axle by one degree, seven degrees, or twenty degrees. As a spoke wheel rotates, the oblique angle causes the spoke wheel to oscillate with respect to the ground. In this way, the spoke wheel may track an undulating (e.g., sinusoidal) path through the soil, displacing soil laterally in alternating directions, as well as reducing buildup of residue and dirt that would cause plugging. Additionally, the front gang and the rear gang may be laterally spaced apart such that the first row of spoke wheels is indexed in spaces between the second row of spoke wheels. In this way, each of the front and rear gangs may cause plugging to be reduced in the spaces between the spoke wheels of the other gang. In some embodiments, the axles may be perpendicular to a direction of travel of the tillage implement while the spoke wheels are positioned at an oblique angle relative to the direction of travel.

Referring now to the drawings, FIG. 1 is a perspective view of an embodiment of a tillage implement 10 (e.g., an agricultural implement) having a frame 11 and a gang assembly 12 of spoke wheels 14 coupled to the frame 11. The tillage implement 10 may include additional gang assemblies of other ground engaging tools, such as front disc blades 18 (e.g., fluted disc blades, notched disc blades, a row of disc blades) rear disc blades 20 (e.g., an additional row of disc blades). The front disc blades 18 are configured to break up a top layer of the soil and to level a surface of the soil. The spoke wheels 14 are configured to further break up and mix residue (e.g., crop material) into the soil. For example, the spoke wheels 14 may be configured to break up clods of soil to establish a desired sizing of the clods. The gang assembly 12 of the spoke wheels 14 may be positioned behind the front disc blades 18 and ahead of the rear disc blades 20. Accordingly, the spoke wheels 14 may break up and mix the soil after the soil has been agitated by the front disc blades 18. Additionally, the spoke wheels 14 may displace unbroken clods of soil into the path of the rear disc blades 20. As a result, the rear disc blades 20 may break up the remaining unbroken clods and level the soil after the spoke wheels 14 have passed over the soil. The tillage implement 10 may also include finishing reels 21 (e.g., rolling baskets) configured to further level the soil surface. As such, the present disclosure provides an arrangement of ground engaging tools that sequentially pass over the soil in a particular sequence.

The ground engaging tools may be supported by gang supports 22 attached to the frame 11 of the tillage implement 10. For some of the ground engaging tools (e.g., front disc blades 18 and rear disc blades 20), an operator may adjust a gang angle 24 between a gang support 22 and a lateral axis 26 (e.g., an axis orthogonal to a vertical axis 28 and a direction of travel 30 of the tillage implement 10). For example, a gang support 22 supporting one or more gangs of rear disc blades 20 may be pivotally coupled at one end to the frame 11 of the tillage implement 10, and the gang angle 24 may be adjusted by locking a position of the other end of the gang support 22 using a gang angle adjustment plate 32. For other ground engaging tools (e.g., spoke wheels 14), the respective gang supports 22 may be fixedly coupled to the frame 11 of the tillage implement 10. For example, each gang support 22 for the spoke wheels 14 may be fixed at a perpendicular angle relative to the direction of travel 30. That is, each gang support 22 for the spoke wheels 14 extends in a lateral direction (e.g., along the lateral axis 26). Thus, the spoke wheels 14 are arranged in rows perpendicular to the direction of travel 30.

Figure 2:
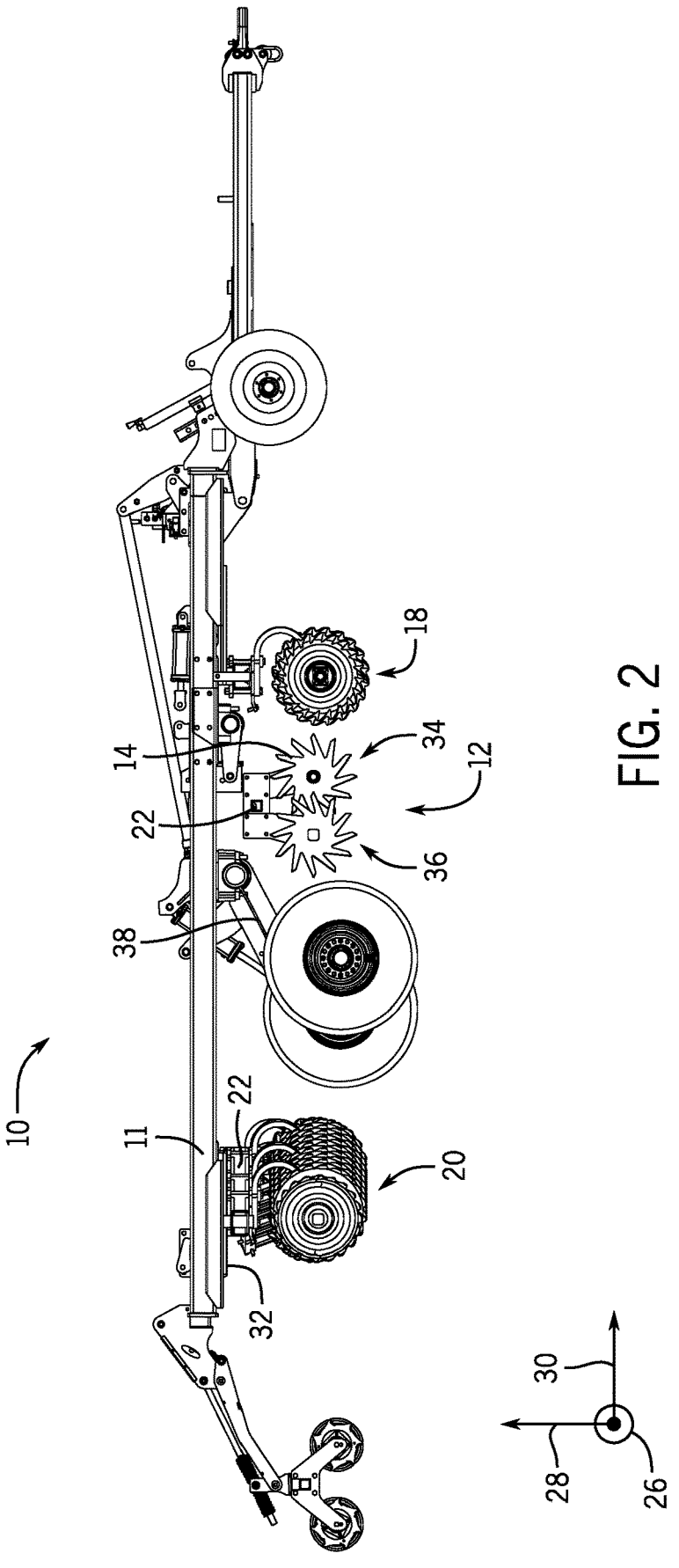
FIG. 2 is a side view of the tillage implement of FIG. 1, in accordance with an aspect of the present disclosure.

FIG. 2 is a side view of the tillage implement 10 of FIG. 1. In the illustrated embodiment, the gang assembly 12 of the spoke wheels 14 includes a front gang 34 and a rear gang 36 of the spoke wheels 14. The spoke wheels 14 in each row are aligned along the lateral axis 26. Moreover, the front gang 34 and the rear gang 36 may be spaced apart along the direction of travel 30, such that there is some overlap between the spoke wheels 14 of the front gang 34 and the rear gang 36.

The penetration depth of the ground engaging tools (e.g., spoke wheels 14) into the soil may be established by setting a desired depth (e.g., which may remain substantially constant as the tillage implement 10 traverses the soil). For example, depth adjustment actuator(s) may drive wheel assemblies 38 to rotate, thereby controlling the height of the frame 11 above the ground, which establishes a desired depth of the ground engaging tools into the soil. In this way, once the frame height is set, the depth of tillage may be substantially constant, even as the ground engaging tools encounter varying levels of compaction. In some embodiments, the penetration depth of the spoke wheels 14 may be equal to the penetration depth of the front disc blades 18 and/or the rear disc blades 20.

Although the illustrated tillage implement includes certain types and quantities of ground engaging tools positioned in certain locations, in other embodiments, the tillage implement may include any suitable number of ground engaging tools, in which each gang of ground engaging tools is positioned at a suitable location. For example, in certain embodiments, the gang assembly 12 of spoke wheels 14 may include any suitable number of gangs (e.g., 1, 5, 10) having a corresponding number of axles (e.g., 1, 5, 10), and each gang may have any suitable number of spoke wheels 14 (e.g., 5, 10, 20). The gang assembly 12 may include multiple gangs arranged along the direction of travel or laterally with respect to one another. Moreover, the tillage implement 10 may include any suitable number of gang assemblies 12 arranged adjacent to one another laterally on the tillage implement 10. In the illustrated embodiment, the gang assembly 12 of spoke wheels 14 is positioned ahead of at least one set of disc blades (e.g., rear disc blades 20) so that the spoke wheels 14 may agitate the soil and displace clods into the paths of the disc blades (e.g., rear disc blades 20) behind the spoke wheels 14. Subsequently, the rear disc blades 20 may break the clods and level the soil surface. In some embodiments, the spoke wheels 14 may be positioned at a front of the tillage implement, ahead of the front disc blades 20. In this way, the soil displacement provided by the spoke wheels may facilitate breakage of the clods by the front disc blades 18 and the rear disc blades 20.

Figure 3:
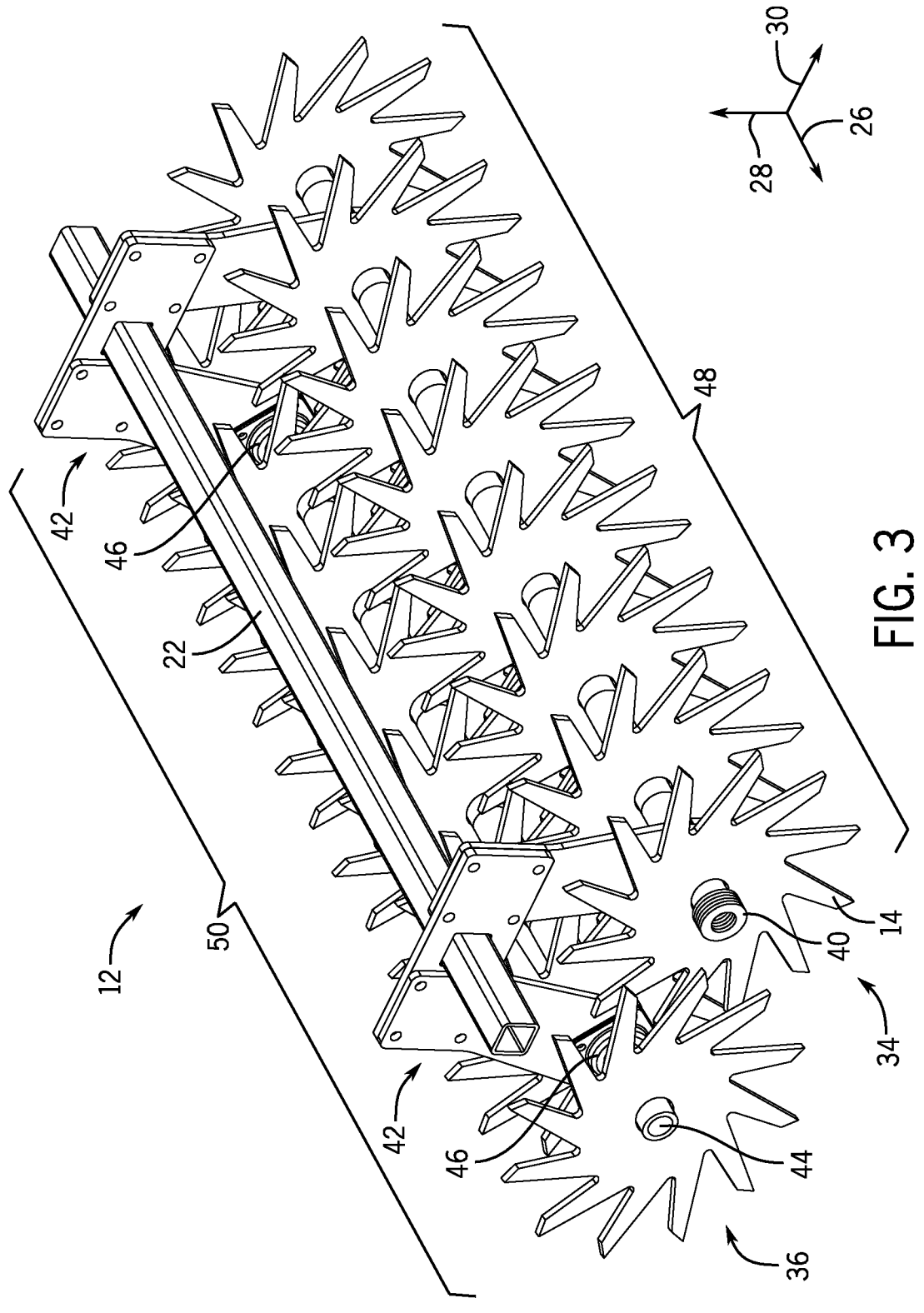
FIG. 3 is a perspective view of a gang assembly of spoke wheels that may be employed within the tillage implement of FIG. 1, in accordance with an aspect of the present disclosure.

FIG. 3 is a perspective view of the gang assembly 12 of the spoke wheels 14 that may be employed within the tillage implement of FIG. 1. As discussed above, the gang assembly 12 includes the front gang 34 positioned ahead of the rear gang 36 with respect to the direction of travel 30. The front gang 34 includes a front axle 40 rotatably coupled to mounting plates 42, which are fixedly coupled to the gang support 22. Likewise, the rear gang 36 includes a rear axle 44 rotatably coupled to the mounting plates 42 attached to the gang support 22. The gang assembly 12 may include bearings 46 (e.g., ball bearings, roller bearings, plain bearings, hydrostatic bearings) to enable the axles to rotate. A first row 48 and a second row 50 of the spoke wheels 14 are coupled to the front axle 40 and the rear axle 44, respectively, such that the spoke wheels 14 rotate to till the soil as the tillage implement moves along the direction of travel 30. In some embodiments, the spoke wheels 14 may be fixedly coupled (e.g., welded) to the axles. In this way, each of the spoke wheels 14 in the same row (e.g., the first row 48, the second row 50) may rotate synchronously. Moreover, because the spoke wheels 14 are fixedly coupled to the axles, each spoke wheel 14 and its respective axle may share an axis of rotation. That is, a rotational axis of the front axle 40 may be the rotational axis of the front row 48 of spoke wheels 14, and a rotational axis of the rear axle 44 may be the rotational axis of the rear row 50 of spoke wheels 14. In addition, each spoke wheel 14 may be angled relative to its rotational axis by the oblique angle.

The front gang 34 and the rear gang 36 may be offset laterally and spaced apart from one another with respect to the direction of travel 30, such that the first row 48 and the second row 50 of the spoke wheels 14 overlap in the direction of travel 30 and do not interfere with one another. Accordingly, each spoke wheel 14 of the first row 48 extends radially into a gap between spoke wheels 14 of the second row 50. As such, lateral coverage of the spoke wheels 14 is divided in alternating fashion between the front gang 34 and the rear gang 36. In this way, the front gang 34 may perform a first pass over the soil, opening strips in the soil where the first row 48 of spoke wheels 14 displaces soil vertically and laterally. The rear gang 36 may perform a second pass over the soil in the wake of the front gang 34. Because the rear gang 36 is offset laterally from the front gang 34, the second row 50 of spoke wheels 14 may engage the soil in the gaps left behind by the first row 48. In this way, the two gangs may coordinate to till the soil with complete lateral coverage while the rear gang 36 helps to level the soil overturned by the front gang 34. Additionally, the first row 48 of spoke wheels 14 may reduce build-up of soil and residue on the rear gang 36 (e.g., between the spoke wheels 14 of the second row 50) by breaking up soil surrounding the spoke wheels 14 of the rear gang 36. Likewise, the second row 50 of spoke wheels 14 may reduce plugging of the front gang 34 by breaking up soil surrounding the spoke wheels 14 of the front gang 34.

Figure 4:
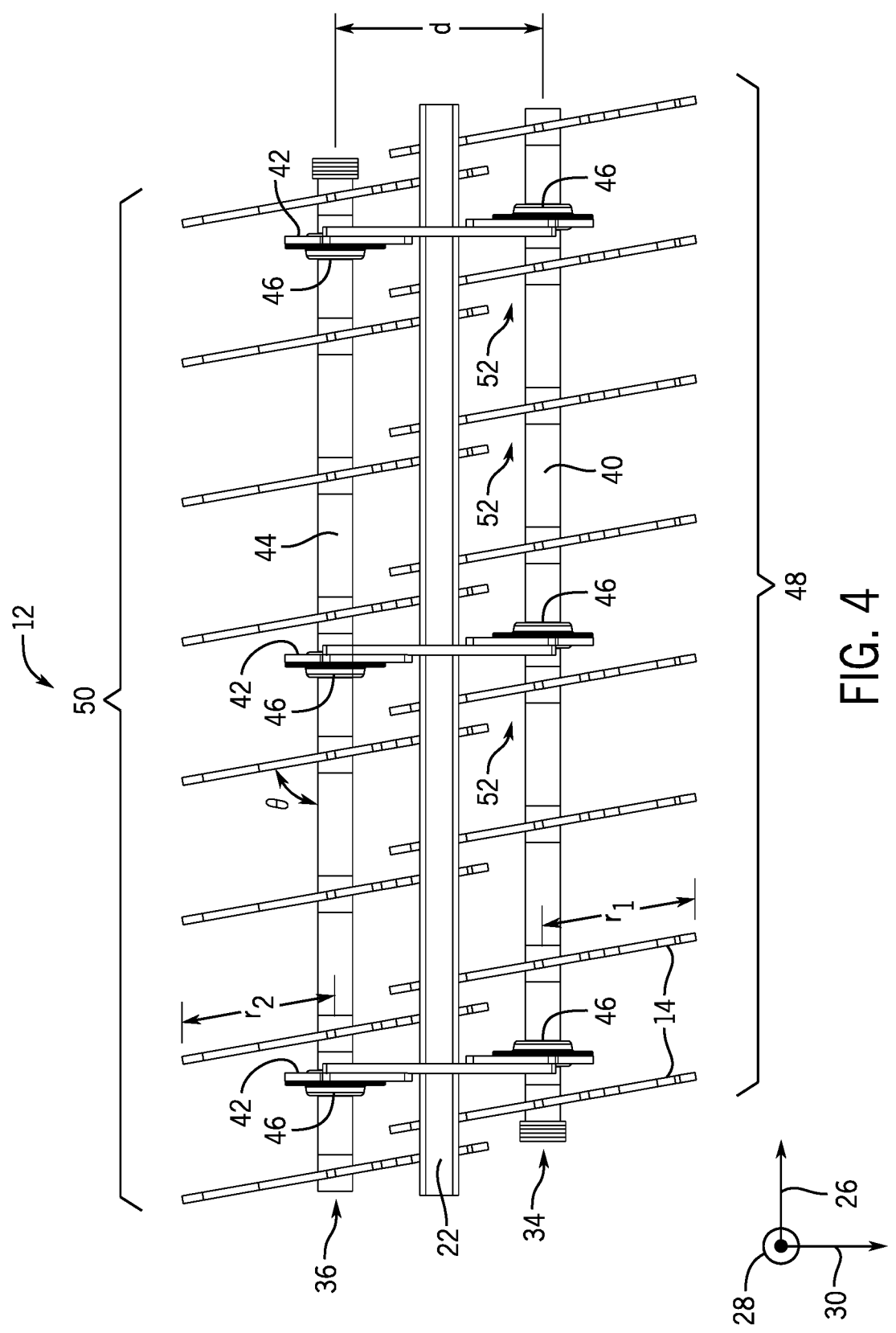
FIG. 4 is a top view of the gang assembly of FIG. 3, in accordance with an aspect of the present disclosure.

FIG. 4 is a top view of the gang assembly 12 of spoke wheels 14 of FIG. 3. As shown, the spoke wheels 14 are coupled to the front axle 40 and the rear axle 44 at an oblique angle θ. The oblique angle θ refers to the angle between a spoke wheel 14 and the axle to which it is coupled. The oblique angle θ may be any angle that is not perpendicular or parallel. For example, the oblique angle θ may be 60°, 80°, 85°, or 89°. Accordingly, the spoke wheels 14 may be tilted at an angle that is offset from the direction of travel 30 by 30°, 10°, 5°, or 1°. For example, the oblique angle θ may be between 80° and 84° (e.g., between 6° and 10° offset from the direction of travel 30). Additionally, the oblique angle θ may range from 60° to 89°. Such an oblique angle θ may improve soil leveling performance and reduce plugging.

Because the spoke wheels 14 are mounted at the oblique angle θ relative to the respective axles, the spoke wheels 14 oscillate relative to the ground as the gangs rotate. Such oscillating motion may reduce plugging of the spoke wheels 14 by subjecting surrounding dirt and residue to varying vertical and lateral forces. Additionally, the oscillating motion may improve leveling of the soil by increasing a lateral displacement of the soil around each spoke wheel 14. In the illustrated embodiment, the spoke wheels 14 are perpendicular to the ground. However, in other embodiments, at least a portion of the spoke wheels 14 may be tilted about an axis extending along the direction of travel 30.

In the illustrated embodiment, the front axle 40 and the rear axle 44 are parallel to the lateral axis 26 of the tillage implement 10 (e.g., extend in the lateral direction). Accordingly, the spoke wheels 14 may be offset from the direction of travel 30 by an offset angle (e.g., the compliment of the oblique angle θ). For example, if the oblique angle θ is 83° between the lateral axis 26 and the spoke wheels 14, then the offset angle is 7° between the spoke wheels 14 and the direction of travel 30. In other embodiments, the front axle 40 and the rear axle 44 may be angled at a gang angle relative to the lateral axis 26. Accordingly, the offset angle may be the sum of the gang angle and the compliment of the oblique angle θ.

The oblique angle θ may cause the spoke wheels 14 to exhibit an oscillation with respect to the soil as the spoke wheels 14 rotate. Additionally, the spoke wheels 14 may track an undulating (e.g., sinusoidal) path through the soil as the lateral positions of penetrating portions of the spoke wheels 14 vary. In this way, the spoke wheels 14 may alternatingly displace soil laterally to the left and right. Such a pattern of soil displacement may improve a leveling effect of the spoke wheels 14 by balancing the displacement of soil to both lateral sides. Additionally, the oscillating motion of the spoke wheels 14 may reduce plugging by inhibiting the buildup of residue and dirt on the surfaces of the spoke wheels 14 and in the spaces between the spoke wheels 14.

The gang assembly 12 further reduces plugging and improves leveling by providing two gangs with the first row 48 and the second row 50 of spoke wheels 14. The rear gang 36 is positioned to overlap partially with the front gang 34 along the direction of travel 30 to enable each gang to break up clods of soil that may build up on the other gang. In other words, the first row 48 of spoke wheels 14 may be indexed between the second row 50. In this way, plugging of the spaces between the spoke wheels may be reduced. For example, clods of dirt that would otherwise build up in gaps 52 between the spoke wheels 14 of the front gang 34 may be broken up by the spoke wheels 14 of the rear gang 36 extending into the gaps 52 due to the overlap. Similarly, the spoke wheels 14 of the front gang 34 may break up dirt that would build up in the gaps 52 between the spoke wheels 14 of the rear gang 36.

For the front gang 34 and the rear gang 36 to overlap along the direction of travel 30, the distance between the gangs may be small enough to enable interlacing between the spoke wheels 14 of each gang. In some embodiments, a distance d between the front axle 40 and the rear axle 44 may be less than $(r_1+r_2)$ sin θ, where $r_1$ is the radius of the spoke wheels 14 of the front gang 34, and $r_2$ is the radius of the spoke wheels 14 of the rear gang 36. This relationship between the radii $r_1$ and $r_2$, the oblique angle θ, and the distance d provides a geometric constraint such that the front gang 34 overlaps with the rear gang 36 along the direction of travel 30. In some embodiments, the radii of the spoke wheels of the front gang 34 and the rear gang 36 may be equal (i.e., $r_1=r_2$). Additionally, the front gang 34 may be spaced far enough from the rear gang 36 to prevent the spoke wheels of one gang from engaging the axle of the other gang. For example, the gangs may be arranged such that d>$r_1$ sin (θ) and d>$r_2$ sin (θ).

In the illustrated embodiment, all of the spoke wheels 14 are coupled to the axles at the same oblique angle θ such that the spoke wheels 14 rotate in phase with one another. That is, the spoke wheels 14 may be parallel with one another. In other embodiments, certain spoke wheels 14 may have different oblique angles θ, and/or certain spoke wheels 14 may be rotated out of phase with one another. That is, the spoke wheels 14 may not be parallel with one another.

The front gang 34 and the rear gang 36 may be supported at multiple locations by mounting plates 42 coupled to the gang support 22. The axles may be attached to the mounting plates 42 via the bearings 46, which are integral or coupled to the mounting plates 42. As such, the axles may rotate as the spoke wheels 14 roll through the soil.

Figure 5:
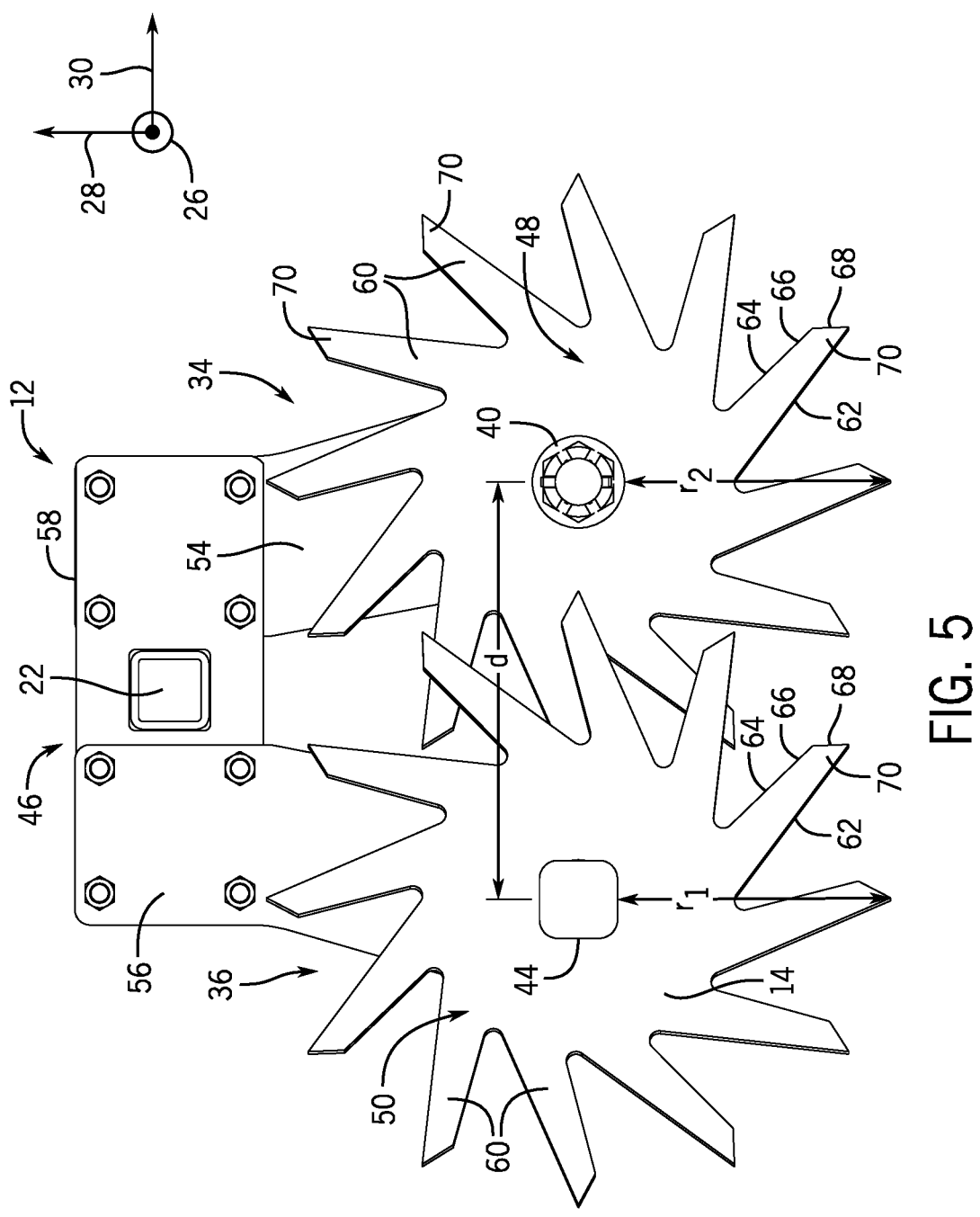
FIG. 5 is a side view of the gang assembly of FIG. 3, in accordance with an aspect of the present disclosure.

FIG. 5 is a side view of the gang assembly 12 of spoked wheels of FIG. 3. As discussed above, the front axle 40 and the rear axle 44 are coupled to the gang support 22 via mounting plates 42. For example, the front axle 40 may be rotatably coupled to a first mounting plate 54 and the rear axle 44 may be rotatably coupled to a second mounting plate 56. The first mounting plate 54 and the second mounting plate 56 may be fixedly coupled (e.g., bolted) to a third mounting plate 58 and the third mounting plate 58 may be fixedly coupled to the gang support 22. Accordingly, the first mounting plate 54 and the second mounting plate 56 may be coupled to the gang support 22. For example, the gang support 22 may extend through a hole (e.g., a square hole) of the third mounting plate 58, such that the front gang 34 and the rear gang 36 are supported by the gang support 22 and the third mounting plate 58 via the first mounting plate 54 and the second mounting plate 56. The gang support 22 may be integral or coupled to the frame of the tillage implement.

The spoke wheels 14 may have a shape that facilitates improved tillage. For example, each spoke wheel 14 may include spokes 60 extending outwardly from a center section of the spoke wheel 14. As the spoke wheel 14 rotates, the spokes 60 may penetrate the soil to break up clods and mix residue into the soil. Each spoke 60 may have a profile configured to provide effective preparation of the soil. As illustrated, the direction of travel 30 is to the right of the page. As such, the spoke wheels 14 may rotate in a forward (e.g., clockwise when viewed from the right side) direction. Each spoke 60 may include a rake edge 62 and a clearance edge 64. The rake edge 62 is configured to contact the soil first and lead the clearance edge 64 through the soil. The clearance edge 64 may include an inner segment 66 and an outer segment 68 tapered off at an angle from the inner segment 66. The outer segment 68 may be shorter than the inner segment 66 and shaped to fling clods of dirt away from the spokes 60. At the outer end of the spoke, the rake edge

62 and the outer segment 68 of the clearance edge 64 may converge to form a tooth 70. The tooth 70 may be shaped to facilitate penetration of the soil in a desired manner.

In another configuration, the spoke wheels 14 may be reversed. That is, the spoke wheels 14 may be oriented such that the clearance edge 64, with the inner segment 66 and the outer segment 68, contacts the soil first and leads the rake edge 62 through the soil. Indeed, the orientation of the spoke wheels 14 may be reversible, providing an option to adjust between an aggressive configuration and a gentle configuration.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A tillage implement comprising:
   a front gang comprising a first row of spoke wheels, each coupled to a front axle at an oblique angle;
   a rear gang comprising a second row of spoke wheels, each coupled to a rear axle at the oblique angle; and
   a row of disc blades positioned behind the front gang and the rear gang with respect to a direction of travel of the tillage implement.

2. The tillage implement of claim 1, wherein:
   each spoke wheel of the first row has a first radius;
   each spoke wheel of the second row has a second radius; and
   a distance between the front axle and the rear axle with respect to a direction of travel of the tillage implement is less than the sine of the oblique angle times the sum of the first radius and the second radius.

3. The tillage implement of claim 1, wherein the spoke wheels of the first row are fixedly coupled to the front axle, and the spoke wheels of the second row are fixedly coupled to the rear axle.

4. The tillage implement of claim 1, wherein each spoke wheel of the first row and the second row comprises a plurality of spokes disposed circumferentially around the spoke wheel and configured to penetrate soil.

5. The tillage implement of claim 4, wherein each spoke of the plurality of spokes comprises a rake edge and a clearance edge, and wherein the rake edge is configured to penetrate the soil ahead of the clearance edge.

6. The tillage implement of claim 5, wherein the clearance edge comprises an inner segment and an outer segment shorter than the inner segment, and the rake edge and the outer segment converge to form a tooth.

7. The tillage implement of claim 1, wherein each spoke wheel of the first row and the second row is configured to engage a soil surface along a respective undulating path.

8. The tillage implement of claim 1, comprising a first mounting plate and a second mounting plate, each coupled to a frame of the tillage implement, wherein the front axle is rotatably coupled to the first mounting plate, and the rear axle is rotatably coupled to the second mounting plate.

9. The tillage implement of claim 1, wherein the first row of spoke wheels is indexed between the second row of spoke wheels.

10. The tillage implement of claim 1, wherein the front axle and the rear axle are parallel.

11. The tillage implement of claim 1, comprising an additional row of disc blades configured to couple to a frame of the tillage implement, wherein the front gang of spoke wheels and the rear gang of spoke wheels are configured to be mounted to the frame behind the additional row of disc blades relative to a direction of travel of the tillage implement.

12. The tillage implement of claim 1, wherein the front axle and the rear axle are perpendicular to a direction of travel of the tillage implement.

13. A tillage implement, comprising:
a gang support configured to support a front gang and a rear gang;
the front gang, comprising:
a front axle extending along a lateral axis of the tillage implement, wherein the front axle is rotatably coupled to the gang support; and
a first row of spoke wheels coupled to the front axle at an oblique angle;
the rear gang, comprising:
a rear axle rotatably coupled to the gang support, wherein the rear axle is parallel to the front axle; and
a second row of spoke wheels coupled to the rear axle at the oblique angle; and
a row of disc blades positioned behind the front gang and the rear gang with respect to a direction of travel of the tillage implement.

14. The tillage implement of claim 13, wherein:
each spoke wheel of the first row has a first radius;

each spoke wheel of the second row has a second radius; and
a distance between the front axle and the rear axle with respect to the direction of travel of the tillage implement is less than the sine of the oblique angle times the sum of the first radius and the second radius.

15. The tillage implement of claim 13, wherein the oblique angle is between 60 and 89 degrees.

16. The tillage implement of claim 13, wherein the spoke wheels are configured to engage a soil surface along a respective sinusoidal path.

17. The tillage implement of claim 13, comprising a first mounting plate and a second mounting plate, each coupled to the gang support, wherein the front axle is rotatably coupled to the first mounting plate, and the rear axle is rotatably coupled to the second mounting plate.

18. A tillage implement, comprising:
a frame;
a set of disc blades coupled to the frame;
a gang assembly coupled to the frame ahead of the set of disc blades with respect to a direction of travel of the tillage implement, wherein the gang assembly comprises:
a front gang comprising a first row of spoke wheels, wherein the spoke wheels of the first row are coupled to a front axle at an oblique angle; and
a rear gang comprising a second row of spoke wheels, wherein the spoke wheels of the second row are coupled to a rear axle at the oblique angle.

19. The tillage implement of claim 18, wherein the set of disc blades is a set of rear disc blades, and the tillage implement comprises a set of front disc blades positioned ahead of the gang assembly with respect to the direction of travel of the tillage implement.

20. The tillage implement of claim 18, wherein the first row of spoke wheels is indexed between the second row of spoke wheels.

* * * * *